(12) United States Patent
Chapman

(10) Patent No.: US 6,360,617 B1
(45) Date of Patent: Mar. 26, 2002

(54) LOAD CELL DEVICE FOR AIRCRAFT WASTE MEASUREMENT

(75) Inventor: Douglas Marden Chapman, Irvine, CA (US)

(73) Assignee: Kaiser Electroprecision, Irvine, CA (US)

(*) Notice: Subject to any disclaimer, the term of this patent is extended or adjusted under 35 U.S.C. 154(b) by 0 days.

(21) Appl. No.: 09/238,490

(22) Filed: Jan. 27, 1999

(51) Int. Cl.$^7$ ................................................. G01L 1/04
(52) U.S. Cl. ................................................. 73/862.627
(58) Field of Search ..................... 73/141, 144, 862.627

(56) References Cited

U.S. PATENT DOCUMENTS 4,052,891 A * 10/1977 Barlett .......................... 73/144
4,130,014 A * 12/1978 Eddens .......................... 73/144
4,326,424 A * 4/1982 Koenig ....................... 73/862.48

* cited by examiner

Primary Examiner—Benjamin R. Fuller
Assistant Examiner—Jewel V. Thompson
(74) Attorney, Agent, or Firm—Kleinberg & Lerner; Marvin H. Kleinberg

(57) ABSTRACT

A load cell assembly for use in measuring the level of a liquid in an airplane waste tank includes a lower member, a spherical bearing placed in the lower member, an upper member, in contact with the spherical bearing, and a fastener to couple the lower member, spherical bearing and upper member together, the lower member having pockets formed therein and including a strain gauge device within each of the pockets.

7 Claims, 3 Drawing Sheets

LOAD CELL DEVICE FOR AIRCRAFT WASTE MEASUREMENT

BACKGROUND OF THE INVENTION

1. Field of the Invention

The present invention relates to the field of measuring systems, and more particularly to a load cell device used in a measuring and detection system for determining the weight and therefore the quantity of a liquid in a tank subjected to external forces.

2. Description of the Related Art

The present invention discloses a load cell device which can be used in a measuring system similar to that described in U.S. Pat. No. 5,133,212, and assigned to the assignee of the present invention. That system teaches the use of a strain gauge system which can determine the weight of the contents of a tank and therefore the quantity of liquid in the tank without the need for sensors or other measuring devices inside the tank. One common application of the present invention is for use in measuring the amount of liquid and other matter inside an airplane waste tank.

Waste tanks designed into most aircraft models have liquid level monitoring and control devices which operate by sensing the waste contents in some way. Most sensors require access to the inside of the tank. These sensors are "intrusive" into the tank, and by their nature must come into contact with the tank's contents. These type of intrusive devices are undesirable in many cases because they may easily corrode or become fouled in the presence of the waste material. This corrosion or fouling often renders the intrusive sensors unreliable and inoperable.

U.S. Pat. No. 5,133,212 describes a system which is able to measure the level of liquid inside the waste tank without the use of intrusive sensors. In the '212 patent, the waste tank is weighed using a load cell device. The load cell utilizes strain gauges to measure the amount of force (and hence the weight) exerted by the tank and its contents. The output of the load cell device is an electrical signal which is proportional to the amount of force exerted by the tank. The weight of the empty tank (which is a known quantity) is then subtracted from the measured weight. The weight of the waste amount is indicated by means of a scaled electrical signal. The liquid level is then easily calculated.

The signal from the load cell is also filtered to avoid changes due to air turbulence or oscillating motions of the airplane. In practice, a plurality of load cell devices are used for each waste tank, in order to provide the most accurate measurement of the liquid level.

Most larger passenger airlines in operation today use a cylindrically shaped tank. However, it is clear that the present invention is not intended to be limited to any particular shape of waste tank. In one aircraft configuration, the tank is disposed vertically within the aircraft structure. A flange on the tank is used to support the tank and its contents. Typically, the flange is manufactured from a non-metallic reinforced fiberglass type material. The flange usually rests on a support structure made of aluminum metal.

The flanges are attached to the support structure by means of bolts. In actual practice, a pair of bolts is used with each flange. It is known in the prior art, that a load cell can be placed in between the flange and the support structure. The load cell is held in place with the bolts used to secure the tank. The load cells transduce the weight-generated forces as is described above.

There are limitations with the method and apparatus as described above. In particular, it is known that the fiber-glass flanges have a very uneven surface. This is due to the methods which are used to manufacture the flange. (At other times, the surface of the support structure may also be uneven.) Because most airplanes already have the waste tanks in place, it is not practical to attempt to even out the surface of the flange.

It has also been found that when a load cell is bolted between the flange and the support structure, uneven and large forces are exerted on the load cell. These forces are primarily in the form of a turning moment. The magnitude and direction of the moment cannot be readily determined beforehand because of the uneven nature of the flange. This turning moment interferes with the force sensing of the load cell.

In addition to the uneven surface, the flange material is typically much less stiff than the aluminum support structure. When the tank is filled, the changes in the rotational moment at the sensor adds to the signal output. The extra signal component is due to the fact that any sensor cannot totally cancel the unwanted forces caused by the moments. The flange stiffness can vary from one flange location to another. The stiffness can also vary at each location over the life cycle of the component. These factors make it difficult to calibrate the system and retain the required accuracy through the life of the unit.

It is therefore an object of the present invention to provide a load cell device which can be used in connection with waste tanks on existing aircraft.

It is another objection of the present invention to provide a load cell device which accurately measure the weight of the waste tank despite the movement or attitude of the aircraft structure.

It is yet another object of the present invention to provide a load cell device which can compensate for turning moments exerted on the device due to any irregularities or uneven surfaces where the load cell device is mounted.

SUMMARY OF THE PRESENT INVENTION

The present invention consists of a load cell device which can be used in a system to measure the weight of airplane liquid waste tanks. The load cell assembly is designed to minimize unwanted forces and turning moments acting on the strain gauge devices which actually measure the weight of the tanks. Elimination of these unwanted forces and moments results in a more accurate measurement of the weight of the tank.

The load cell assembly of the present invention consists of an upper beam and a lower beam which are coupled together. A spherical bearing is placed between these two elements. The assembly is held together by a fastener bolt which passes through the spherical bearing, permitting the elements limited rotational movement about an axis coaxial with the fastener bolt. The lower beam has attached to it one or more strain gauge devices which are used to measure the vertical load acting on the load cell device.

DETAILED DESCRIPTION OF THE PREFERRED EMBODIMENT

A load cell device which can be used in a system for measuring and detecting the weight and therefore the quantity of a liquid in a tank subjected to external forces will be described. In the following description, for the purposes of explanation, specific construction details, arrangements, and materials are set forth in order to provide a more thorough understanding of the present invention. It will be apparent to those skilled in the art, however, that the present invention may be practiced without these specific details. In other instances, well known manufacturing methods and structures have not been described in detail so as not to obscure the present invention unnecessarily.

Figure 1:
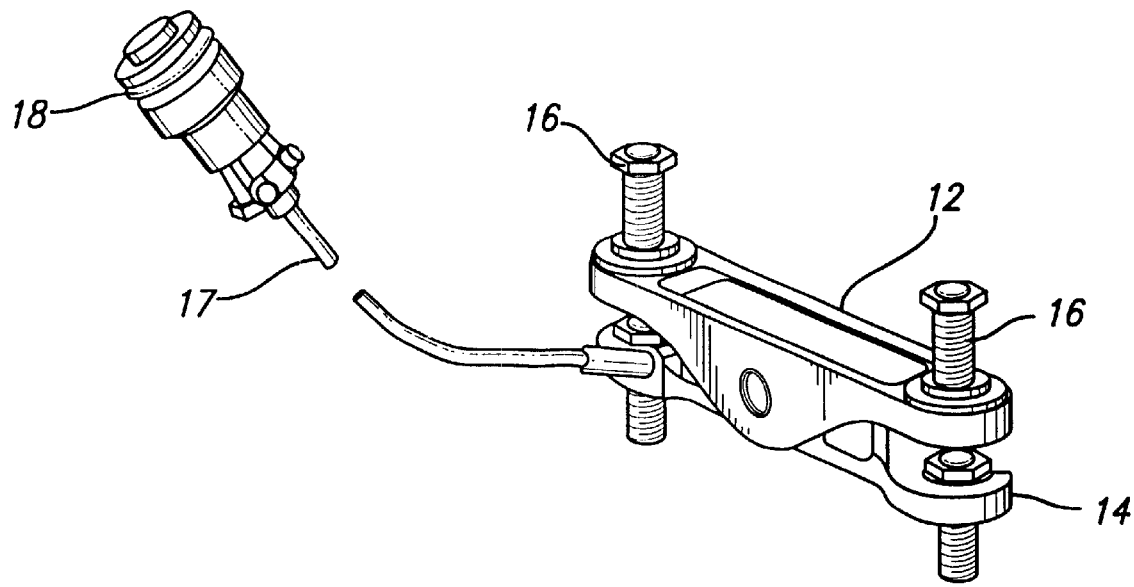
FIG. 1 is a perspective view of a load cell assembly of the present invention.

Referring first to FIG. 1, a perspective view of a load cell assembly 10 of the present invention is shown. The load cell assembly consists of an upper beam 12 which is coupled to a lower beam 14. An electrical cable 17 with an associated connector 18 is coupled to electrical elements (described below with respect to FIG. 7.) mounted on the lower beam. The cable 17 is the means for outputting the scaled electrical signal which represents the weight of the tank.

Two bolts 16 are provided to attach the load cell assembly 10 to a support surface (not shown). In the preferred embodiment, the load cell of the present assembly is intended to be mounted between a waste tank flange and a support surface of an airplane structure. It will be apparent to those skilled in the art, however, that this is not the only application for the present invention. The present invention may be employed wherever it is desired to use non-intrusive means to measure the level of any liquid within a tank. More generally, the load cell device of the present invention can be used in a system to measure the weight of an object while it is in place and without resorting to the use of traditional scales or other measuring devices.

Figure 2:
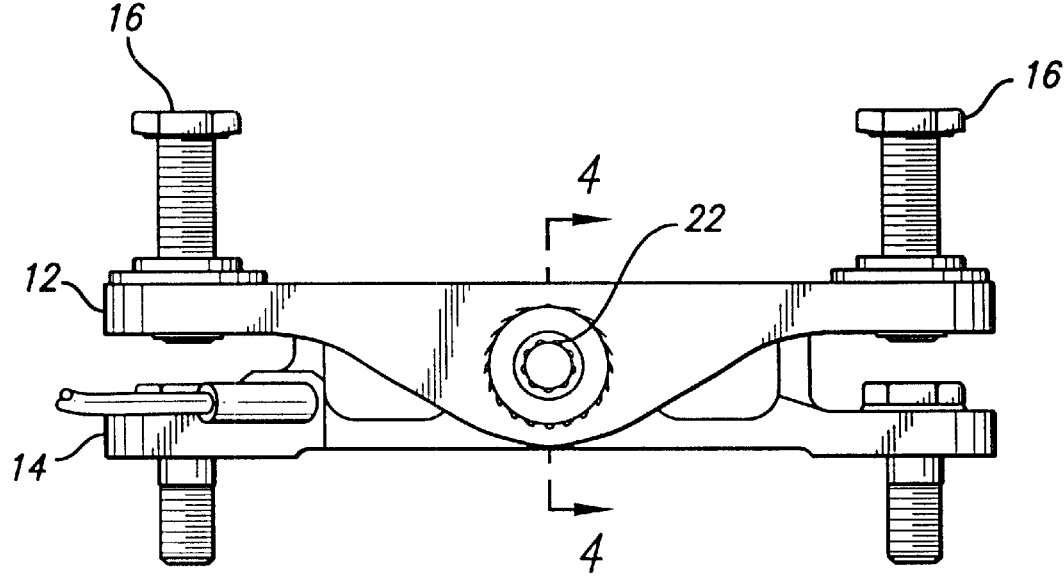
FIG. 2 is a side view of the load cell assembly.
Figure 3:
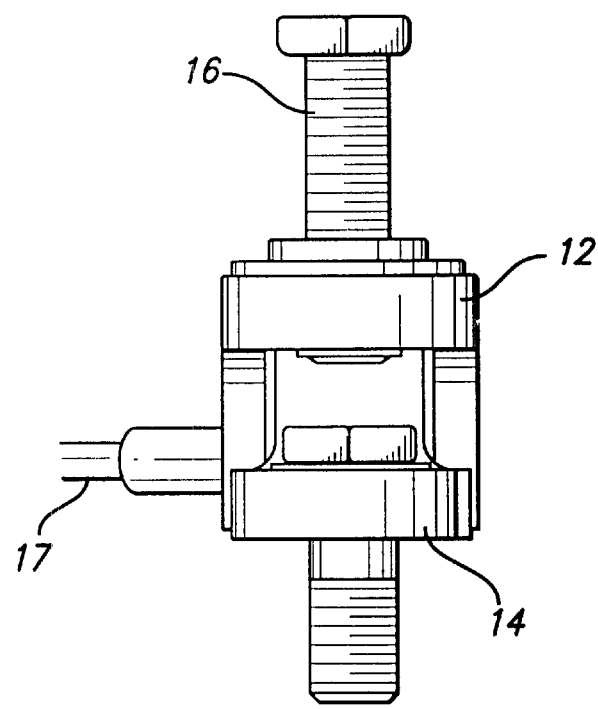
FIG. 3 is an end view of the load cell assembly.

Referring next to FIG. 2, a side view of the load cell assembly 10 is shown. FIG. 2 more clearly shows the arrangement of the upper beam 12 and the lower beam 14. As can be seen in FIG. 2, a coupling bolt 22 is used to hold the upper beam 12 and lower beam 14 together. In an alternative embodiment, a pin may be used in place of the bolt 22. The weight of the tank is exerted on the upper beam. The upper beam 12 passes the load through the coupling bolt 22 to the lower beam. A side view of the load cell assembly 10 is shown in FIG. 3.

Figure 4:
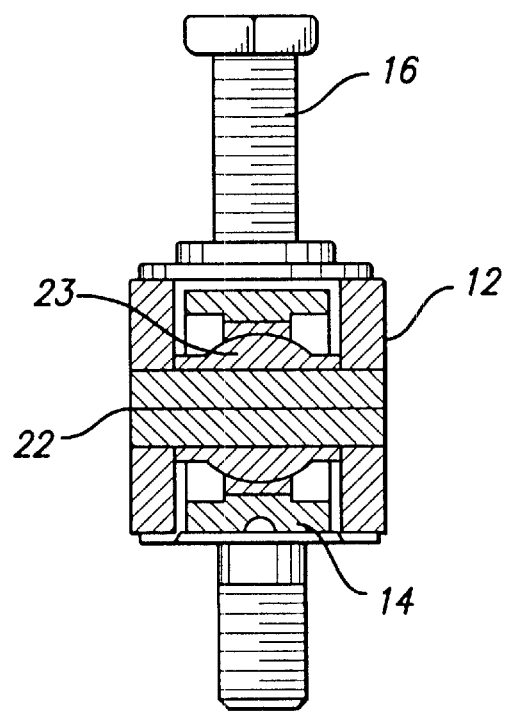
FIG. 4 is a cross sectional view of the load cell assembly taken along the line 4—4 in FIG. 2 in the direction of the appended arrows.

Referring next to FIG. 4, a cross-sectional view of the assembled load cell assembly 10 is shown. The relationship between the upper beam 12 and the lower beam 14 is illustrated. FIG. 4 also illustrates the structure and location of the coupling bolt 22 and the spherical bearing 23. The spherical bearing 23 is located, in the preferred embodiment, at approximately the center of the load cell assembly 10. This results in minimizing the bending moments and enables a more accurate measurement of the tank weight by the strain gauge devices which are described below with respect to FIG. 7.

The spherical bearing 23 is swaged into the lower beam 14. The fastener bolt 22 passes through the upper member and the spherical bearing 23. This results in the weight force of the waste tank being transferred through the spherical bearing 23 to the lower beam 14. In the preferred embodiment, the only forces transferred to the lower beam 14 of the load cell assembly 10 are the force vectors which pass through the center of the spherical bearing 23 (except for some small frictional moment). The vertical load, which represents a portion of the tank weight, is divided naturally between the two portions of the lower beam 14 on either side of the spherical bearing. The spherical bearing further includes a liner with a low coefficient of friction. This helps remove most of the turning moments from the sensing elements (i.e., the strain gauges) of the load cell.

The spherical bearing 23 allows the upper and lower beams to have a limited amount of rotational movement relative to each other. The load cell device can therefore compensate for any uneven surface on the tank flange or the aircraft structure. As a result, the arrangement of the load cell assembly 10 with the spherical bearing 23 in the present invention is less sensitive to end loading, side loading and unwanted moments. All of these forces can readily distort the measurements made by the strain gauge devices. Such distortion results in erroneous measurements of the weight of the tank. The spherical bearing reduces these errors.

Figure 5:
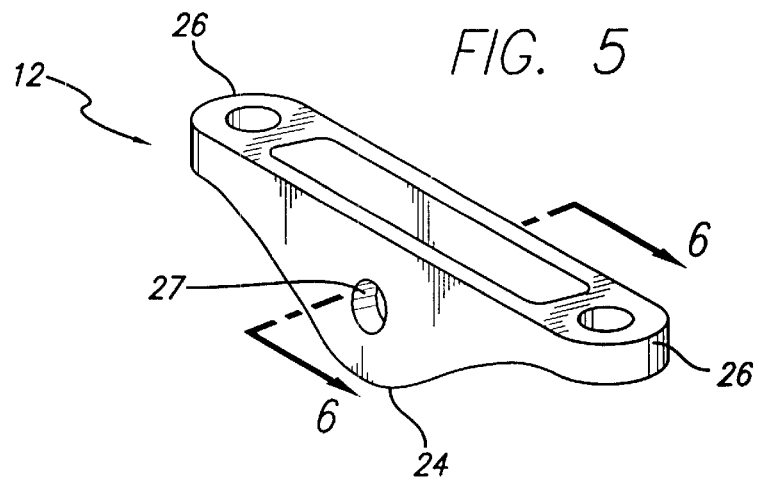
FIG. 5 is a perspective view of the upper beam element of the present invention.
Figure 6:
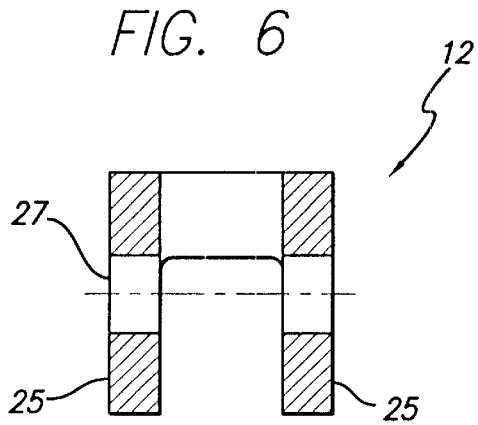
FIG. 6 is a cross sectional view of the upper beam taken along the line 6—6 in FIG. 5 in the direction of the appended arrows.

Referring next to FIG. 5 a perspective view of the upper beam 12 is shown. The upper beam is designed to carry the forces which might typically be expected to be encountered by the assembly 10. The upper beam 12 includes a pair of rectangular shaped side plates 25. These side plates 25 are best illustrated in FIG. 6, which is a cross sectional view of the upper beam. Referring again to FIG. 5, it is seen that the upper beam does 12 not have a constant depth along its length. The depth is greatest at the center 24 and tapers off toward the ends 26. This shape accommodates the bending moment exerted on the load cell assembly 10. The bending moment is greatest at the center of the upper beam 12. The reduced depth at the ends 26 facilitates the mounting of the load cell assembly 10. A hole 27 is provided in the side of the side plates 25. The hole 27 is intended to accept the bolt 22.

Figure 7:
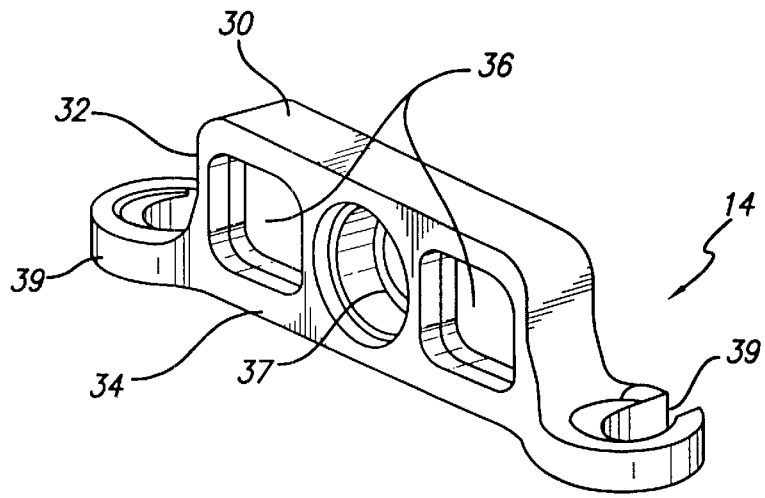
FIG. 7 is a perspective view of the lower beam element of the present invention.

Referring next to FIG. 7, a perspective view of the lower beam 14 is shown. The lower beam 14 has an "I" beam type structure. It has been found that this arrangement maximizes the load carrying capability of the assembly. The flange 30 and web 36 feature sizes are optimized for the load cell function. A hole 37 passes through the lower beam 14. The purpose of the hole 37 is to accept a bolt and spherical bearing (not illustrated in FIG. 7). A pair of mounting slots 39 are disposed in the lower beam 14. These slots 39 assist with the installation of the load cell assembly in instances where an airplane waste tank is already in place.

The lower beam 14 has a number of pockets 36 formed into its web portion. In the preferred embodiment, there are four pockets 36, two on each side of the beam. The pockets in the preferred embodiment are arranged symmetrically on the lower beam 14 (In FIG. 7, only two pockets are illustrated.) The pockets 36 accept and have mounted in them strain gauge devices. It is the strain gauges which produce an electrical signal which is proportional to the forces acting on the load cell. It will be apparent to those skilled in the art that a larger or smaller number of pockets and strain gauges may be used. The electrical outputs of the strain gauge devices are coupled to cable 17 and connector 18 which are illustrated in FIG. 1.

The description of the present invention has been made with respect to specific arrangements and constructions of a load cell device. It will be apparent to those skilled in the art that the foregoing description is for illustrative purposes only, and that various changes and modifications can be made to the present invention without departing from its overall spirit and scope. The full extent of the present invention is defined and limited only by the following claims.

What is claimed is:

1. A load cell assembly, comprising:

a lower member, said lower member being substantially elongated and including at least a web portion; said web portion having a plurality of pockets, a plurality of strain gauge devices disposed within each of said pockets, each bonded to said lower member web portion;

a spherical bearing disposed within said web portion of said lower member;

an upper member adapted to be coupled to an applied force, said upper member being substantially elongated, said upper member being in contact with said spherical bearing, said upper member being arranged and disposed to be independent of said lower member;

a fastener bolt disposed through a hole in said spherical bearing, said hole passing through the center of said spherical bearing, wherein said fastener bolt couples said spherical bearing and said upper member together in a substantially rigid assembly which is free to rotate relative to said lower member; and.

2. The device of claim 1 wherein said upper member has a height and two ends, and wherein said height varies along a length of said upper member, said height being greatest at a center of said length, and tapering to a minimum at each of said ends of said upper member.

3. The device of claim 1 wherein there are four pockets formed within said web portion of said lower member.

4. The device of claim 1 further comprising electrical cable means coupled to each of said strain gauge devices.

5. The device of claim 1 wherein the load cell assembly further comprises attachment means for mounting the load cell assembly between an aircraft frame and an aircraft waste tank between which applied forces are to be sensed and signaled.

6. The device of claim 3 wherein said attachment means comprises slotted holes.

7. The device of claim 5 wherein said applied force comprises a weight exerted by said aircraft waste tank and its contents.

* * * * *